(12) United States Patent
Seo et al.

(10) Patent No.: US 9,128,295 B2
(45) Date of Patent: Sep. 8, 2015

(54) LIQUID CRYSTAL LENS PANEL, THREE DIMENSIONAL PANEL ASSEMBLY, AND DISPLAY APPARATUS HAVING THE SAME

(71) Applicant: Samsung Display Co., Ltd., Yongin (KR)

(72) Inventors: Hyun-Seung Seo, Uiwang-si (KR); Hae-Young Yun, Suwon-si (KR); Il-Joo Kim, Hwaseong-si (KR); Seung-Jun Jeong, Hwaseong-si (KR); Seon-Ki Kim, Anyang-si (KR); Jin-Hwan Kim, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 179 days.

(21) Appl. No.: 13/721,812

(22) Filed: Dec. 20, 2012

(65) Prior Publication Data

US 2014/0063379 A1    Mar. 6, 2014

(30) Foreign Application Priority Data

Aug. 29, 2012    (KR) .................. 10-2012-0094848

(51) Int. Cl.
| | |
|---|---|
| *G02B 27/22* | (2006.01) |
| *G02B 3/12* | (2006.01) |
| *G02B 27/26* | (2006.01) |
| *H04N 13/04* | (2006.01) |

(52) U.S. Cl.
CPC ............... *G02B 27/225* (2013.01); *G02B 3/12* (2013.01); *G02B 27/26* (2013.01); *H04N 13/0434* (2013.01)

(58) Field of Classification Search
CPC .. G02B 27/2214; G02B 27/225; G02B 27/22; G02B 3/0087; G02B 3/08; G02F 1/133526; G02F 1/134309; G02F 1/134363; G02F 1/13471; G02F 1/1323; G02F 1/13; G02F 1/1326; G02F 1/133753; G02F 1/1343; G02F 1/134336; G02F 2001/294; G02F 2001/133738; G02F 2001/133757; G02F 2001/133742; G02F 2001/134381; G02F 2001/133638; G02F 2202/40; H04N 13/0404; H04N 13/0409; H04N 13/0402; G02C 7/083
USPC ............... 349/200, 15, 57, 139, 33, 123, 130, 349/143, 181, 95, 117, 129, 193, 65; 348/51, 42; 359/462, 463, 489.07, 619, 359/256, 295, 489.14, 642; 353/7
See application file for complete search history.

(56) References Cited

U.S. PATENT DOCUMENTS

| | | | |
|---|---|---|---|
| 7,139,042 B2 * | 11/2006 | Nam et al. ...................... 349/15 |
| 2007/0296911 A1 | 12/2007 | Hong | |
| 2011/0157498 A1 | 6/2011 | Kim et al. | |
| 2011/0292306 A1 | 12/2011 | Kim et al. | |

* cited by examiner

*Primary Examiner* — Thoi Duong
(74) *Attorney, Agent, or Firm* — H.C. Park & Associates, PLC

(57) ABSTRACT

A liquid crystal lens panel includes a first substrate, a second substrate, and a liquid crystal layer. The first substrate includes a first base substrate, a lens common electrode disposed on the first base substrate, and a first alignment layer disposed on the lens common electrode, the first alignment layer including a first alignment direction. The second substrate includes a second base substrate opposite to the first base substrate, a plurality of lens electrodes that extend in a lens axis and is parallel with each other, and a second alignment layer disposed on the plurality of lens electrodes, the second alignment layer including a second alignment direction substantially perpendicular to the first alignment direction. The liquid crystal layer is disposed between the first and second alignment layers.

18 Claims, 7 Drawing Sheets

# LIQUID CRYSTAL LENS PANEL, THREE DIMENSIONAL PANEL ASSEMBLY, AND DISPLAY APPARATUS HAVING THE SAME

CROSS-REFERENCE TO RELATED APPLICATION

This application claims priority from and the benefit of Korean Patent Application No. 10-2012-0094848, filed on Aug. 29, 2012, which is hereby incorporated by reference for all purposes as if fully set forth herein.

BACKGROUND

1. Field

Exemplary embodiments relate to display technology, and more particularly, to lens panels, stereoscopic display panel assemblies, and display devices including the same.

2. Discussion

As demand for three-dimensional ("3D") stereoscopic images increases in consumer markets like the game market, the movie market, and so on, display devices configured to display 3D stereoscopic images have been developed. For instance, conventional 3D display devices are configured to present two-dimensional ("2D") images different from each other to respective eyes of an observer, such that the 3D stereoscopic image can be autonomically perceived by the observer. For example, the observer may view a pair of 2D images through respective left and right eyes, and then the 2D images may be mixed in the observer's brain to be recognized as a 3D stereoscopic image.

Typically, 3D stereoscopic display devices are classified into a glasses type display device and a no-glasses type display device. The glasses type display device utilizes polarized light to respectively radiate 2D images to respective left and right eyes of viewers, whereas the no-glasses type display device utilizes a lenticular lens to separate and, thereby, direct the presentation of left-eye images and right-eye images to corresponding eyes of an observer. In other words, display devices of the glasses type include an active polarizing panel in which a left-eye image and a right-eye image are displayed, such that the display panel changes the polarization of light associated with each image so that the observer, via polarized light glasses, is able to perceive the left-eye image via their left-eye and the right-eye image via their right-eye. Display devices of the no-glasses type include a lenticular lens in which a left-eye image and a right-eye image displayed on sub pixels of a display panel are diffracted into a plurality of views, so that an observer, without the need of any active mechanism, can view the left-eye image via their left-eye and the right-eye image via their right-eye.

It is recognized that display technology has evolved to enable a liquid crystal ("LC") lens panel, including an upper electrode, a lower electrode, and LC disposed between the upper and lower electrodes, to be used as a lenticular lens. It is further recognized that some observers prefer glasses-type 3D display devices, whereas other observers prefer no-glasses type 3D display devices. Accordingly, situations may arise when such observers reside in the same household, are part of the same organization, work at the same location, and/or the like.

Therefore, there is a need for an approach that provides reliable, cost effective techniques to provide display technology configured to enable a glasses type 3D display mode and a no-glasses type display mode.

The above information disclosed in this Background section is only for enhancement of understanding of the background of the invention and, therefore, it may contain information that does not form any part of the prior art nor what the prior art may suggest to a person of ordinary skill in the art.

SUMMARY

Exemplary embodiments provide a liquid crystal lens panel configured to enable a glasses type 3D display mode and a no-glasses type 3D display mode.

Exemplary embodiments provide a lens panel assembly including the aforementioned liquid crystal lens panel.

Exemplary embodiments provide a display apparatus including the above-noted lens panel assembly.

Exemplary embodiments provide a method to drive a display apparatus comprising an autostereoscopic presentation mode and a stereoscopic presentation mode.

Additional aspects will be set forth in the detailed description which follows and, in part, will be apparent from the disclosure, or may be learned by practice of the invention.

According to exemplary embodiments, a liquid crystal ("LC") lens panel includes a first substrate, a second substrate, and an LC layer. The first substrate includes a first base substrate, a lens common electrode disposed on the first base substrate, and a first alignment layer disposed on the lens common electrode, the first alignment layer comprising a first alignment direction. The second substrate includes a second base substrate opposite to the first base substrate, a plurality of lens electrodes that extend in a lens axis and is parallel with each other, and a second alignment layer disposed on the plurality of lens electrodes, the second alignment layer including a second alignment direction substantially perpendicular to the first alignment direction. The LC layer is disposed between the first and second alignment layers.

According to exemplary embodiments, a lens panel assembly includes a liquid crystal lens panel and a first retardation film. The LC lens panel includes: a first substrate, a lens common electrode disposed on the first substrate, and a first alignment layer disposed on the lens common electrode, the first alignment layer comprising a first alignment direction. The LC panel further includes: a second substrate, a plurality of lens electrodes that extend in a lens axis, the plurality of lens electrodes being disposed on the second substrate and being parallel with each other, and a second alignment layer disposed on the plurality of lens electrodes, the second alignment layer including a second alignment direction substantially perpendicular to the first alignment direction, and an LC layer disposed between the first and second alignment layers. The first retardation film is disposed on the second substrate, the first retardation film being configured to change a polarizing direction of incident illumination based on a slope angle θ of the lens axis.

According to exemplary embodiments, a display apparatus includes a display panel and a liquid crystal ("LC") lens panel. The display pane is configured to display an image. The LC lens panel is disposed on the display panel. The LC lens panel includes: a first substrate, a lens common electrode disposed on the first substrate, and a first alignment layer disposed on the lens common electrode, the first alignment layer including a first alignment direction. The LC lens panel further includes: a second substrate, a plurality of lens electrodes that extend in a lens axis, the plurality of lens electrodes being disposed on the second substrate and being parallel with each other, and a second alignment layer disposed on the plurality of lens electrodes, the second alignment layer including a second alignment direction substantially perpendicular to the first alignment direction. The LC panel further includes an LC layer disposed between the first and second alignment layers. The display apparatus includes an autostereoscopic display mode and a stereoscopic display mode.

According to exemplary embodiments, a method includes: receiving selection of an autostereoscopic presentation mode or a stereoscopic presentation mode associated with a display apparatus, the display apparatus comprising a display panel and a lens panel; causing, at least in part, illumination to be radiated towards the display panel and the lens panel; controlling, based on the selection, the display panel in association with presentation of at least one directional image; and controlling, based on the selection, the lens panel in association with the autostereoscopic presentation mode or stereoscopic presentation mode.

According to exemplary embodiments, an observer may view 3D images in both a glasses type display mode (e.g., stereoscopic display (or presentation) mode) and a no-glasses type display mode (e.g., an autostereoscopic display (or presentation) mode). In addition, exemplary embodiments enable illumination losses to be decreased. Further, exemplary embodiments enable reversed-slope regions to be decreased and the diffraction efficiency of illumination to be improved. Moreover, overall illumination efficiency may be improved.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate various exemplary embodiments of the invention, and together with the description serve to explain principles of the invention.

DETAILED DESCRIPTION

Figure 1:
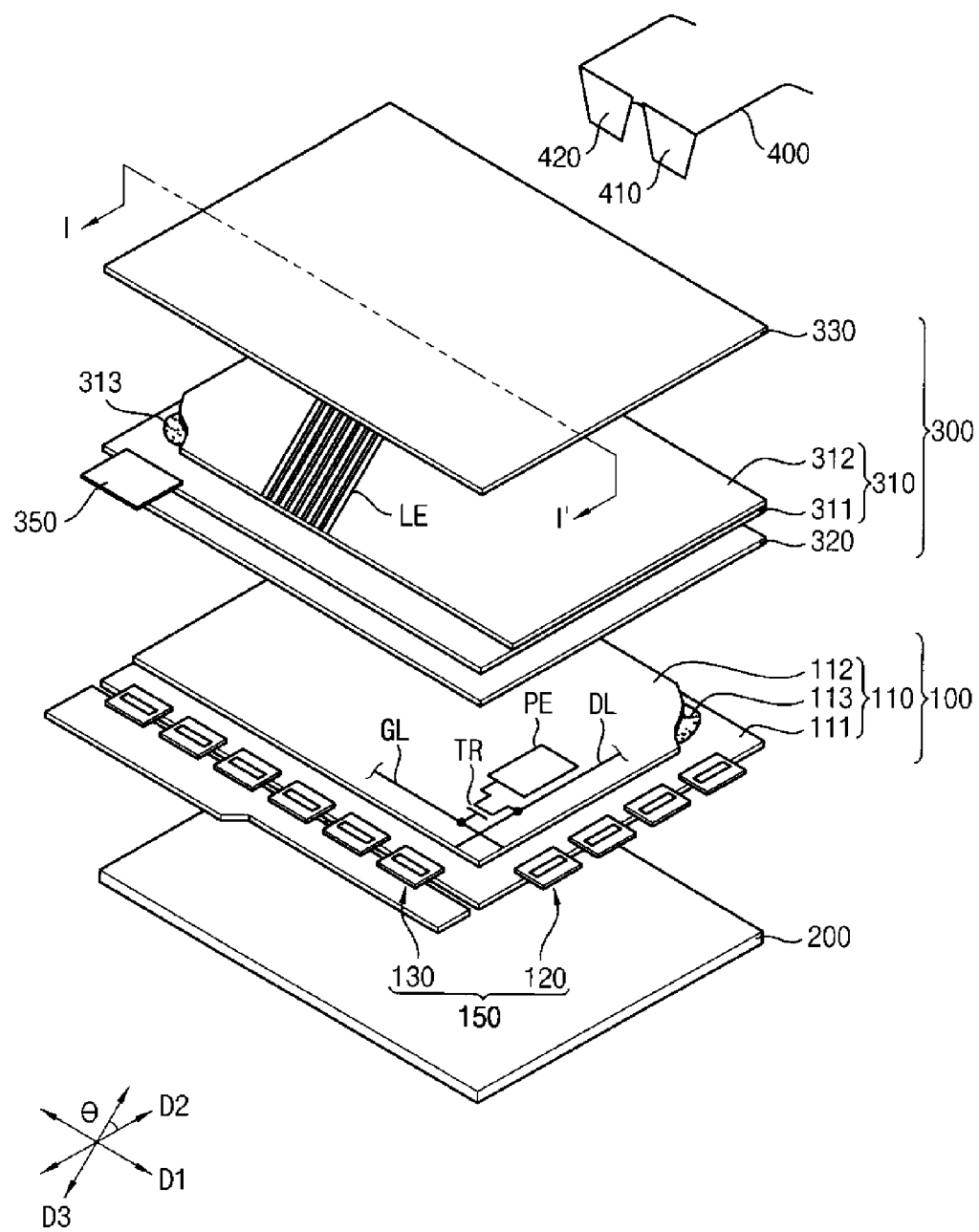
FIG. 1 is an exploded perspective view of a display apparatus, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers and/or regions may be exaggerated for clarity and descriptive purposes. Also, like reference numerals denote like elements.

When an element or layer is referred to as being "on" or "connected to" another element or layer, it may be directly on or directly connected to the other element or layer, or intervening elements or layers may be present. When, however, an element is referred to as being "directly on" or "directly connected to" another element or layer, there are no intervening elements or layers present. For the purposes of this disclosure, "at least one of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by the use of these terms. These terms are only used to distinguish one element, component, region, layer or section from another element, component, region, layer or section. Thus, a first element, component, region, layer or section that is discussed below could be termed a second, third, etc., element, component, region, layer or section without departing from the teachings of the present invention.

Spatially relative terms, such as "beneath", "below", "lower", "above", "upper" and the like, may be used herein for descriptive purposes and, thereby, to describe one element or feature's relationship to another element(s) or feature(s) as illustrated in the drawings. It will be understood that spatially relative terms are intended to encompass different orientations of an apparatus in use and/or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms "a", "an" and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense unless expressly defined as such herein.

Figure 2:
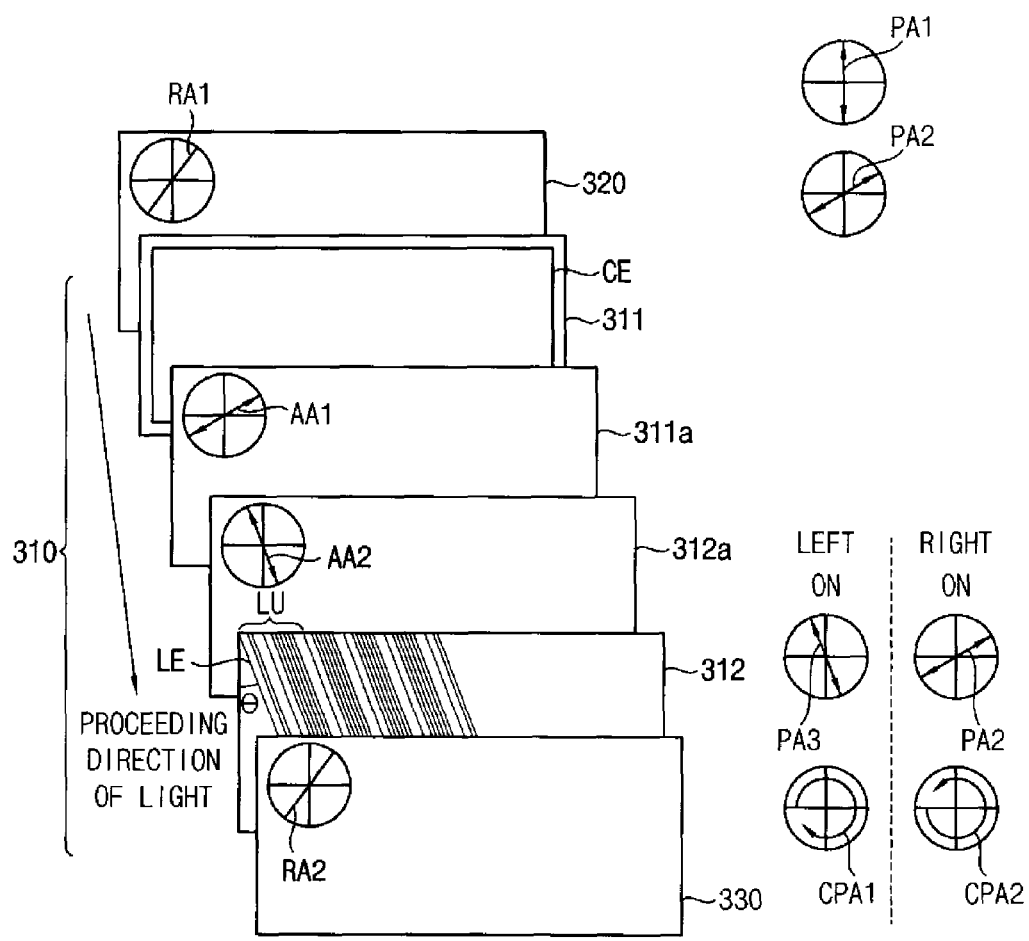
FIG. 2 is an exploded perspective view of a three-dimensional ("3D") panel assembly of the display apparatus of FIG. 1, according to exemplary embodiments.

FIG. 1 is an exploded perspective view of a display apparatus, according to exemplary embodiments. FIG. 2 is an exploded perspective view of a three-dimensional ("3D") panel assembly of the display apparatus of FIG. 1.

Referring to FIGS. 1 and 2, the display apparatus may include a display panel assembly 100, a light-source part 200, a 3D panel assembly 300, and a glasses part 400. While specific reference will be made hereto, it is contemplated the display apparatus may embody many forms and include multiple and/or alternative components and configurations.

The display panel assembly 100 may include a liquid crystal display ("LCD") panel 110 configured to display an image and an image driving part 150 configured to drive the LCD panel 110 to display the image.

The LCD panel 110 may include a first substrate 111, a second substrate 112, and a first LC layer 113.

The first substrate 111 may include a plurality of gate lines (e.g., gate line GL), a plurality of data lines (e.g., data line DL), a plurality of switching elements (e.g., switching element TR), and a plurality of pixel electrodes (e.g., pixel electrode PE), each of which may be referred to herein in their singular or aggregate form. The gate lines GL are extended in a first direction D1 and arranged in a second direction D2 that crosses the first direction D1. The data lines DL are extended in the second direction D2 and arranged in the first direction D1. The switching elements TR are correspondingly connected to ones of the gate lines GL and the data lines DL. The pixel electrodes PE are correspondingly connected to at least one switching element TR and may be disposed in a pixel (or display) area of the display panel assembly 100.

The second substrate 112 may be disposed opposite to the first substrate 111. The first LC layer 113 may be disposed between the first substrate 111 and the second substrate 112. The second substrate 112 may include a color filter (not shown) that is disposed in an area corresponding to the pixel area. In addition, the first substrate 111 may include a pixel common electrode (not illustrated) that is configured to form an electric field (e.g., vertical electric field) between itself and the pixel electrodes PE, which are disposed on the second substrate 112. Additionally or alternatively, the pixel common electrode may be disposed on the second substrate 112 and configured to overlap the pixel electrodes PE so that an electric field (e.g., horizontal electric field) may be formed between itself and the pixel electrodes PE, which are disposed on the same substrate, i.e., the second substrate 111. To this end, the disposition of the common electrode and the pixel electrodes PE may be reversed, i.e., the common electrode may be disposed on the second substrate 112 and the pixel electrodes PE may be disposed on the first substrate 111. Further, the common electrode and the pixel electrodes PE may be disposed on the first substrate 111. It is noted that a slit pattern may be formed in the pixel common electrode and/or the pixel electrodes PE. Moreover, the pixel electrodes PE may be additionally or alternatively patterned.

In a glasses type display mode, the image driving part 150 is configured to sequentially cause the LCD panel 110 to display a left-eye image and a right-eye image. For example, during an odd-numbered frame, the image driving part 150 may be configured to cause the LCD panel 110 to display the left-eye image, and during an even-numbered frame, the image driving part 150 may be configured to cause the LCD panel 110 to display the right-eye image. In a no-glasses type display mode, the image driving part 150 may be configured to cause LCD panel 110 to display a frame picture including multi-view images.

According to exemplary embodiments, the image driving part 150 may include a gate driving part 120 and a data driving part 130. The gate driving part 120 is configured to sequentially provide the gate lines GL with one or more gate signals. As shown in FIG. 1, the gate driving part 120 may be disposed on (e.g., mounted on) the LCD panel 110, such as, in the form of, a tape carrier package ("TCP"), or may be directly disposed on (e.g., formed on) the first substrate 111. In this manner, the gate driving part 120 may be formed via one or more of the process utilized in association with forming the switching element TR. To this end, it is noted that the image driving part 150 (and, thereby, the gate driving part 120 and the data driving part 130) may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. The data driving part 130 is configured to provide the data lines DL with one or more data signals. The data driving part 120 may be disposed on (e.g., mounted on) the LCD panel 110, such as, in the form of, a TCP, or may be directly disposed on (e.g., formed on) the first substrate 111. In this manner, the gate driving part 120 may be formed via one or more of the process utilized in association with forming the switching element TR.

In exemplary embodiments, when the display apparatus operates according to the glasses type display mode, the LCD panel 110 is configured to display left-eye images during odd-numbered frames and right-eye images during even-numbered frames. Alternatively, the LCD panel 110 may display right-eye images during odd-numbered frames and left-eye images during even-numbered frames. When the display apparatus operates according to the no-glasses type display mode, the LCD panel 110 is configured to display multi-view images, such as n viewing images, where "n" is a natural number greater than or equal to two. In other words, a frame picture may be configured to include a plurality of the viewing images. To this end, it is noted that the display resolution associated with the no-glasses type display mode may be "n" times less than the display resolution associated with the glasses type display mode.

The light-source part 200 is configured to generate illumination (e.g., light), as well as radiate such illumination towards the LCD panel 110. The light-source part 200 may be or include a direct-illumination type (not shown) and/or an edge-illumination type light-source (not illustrated). Direct-illumination type light sources typically include at least one light-source that is disposed under (or in relation to) a display area of the LCD panel 110, in which a plurality of pixels is arranged. Edge-illumination type light sources generally include a light guide plate LGP that is disposed under (or in relation to) the display area of the LCD panel 110, as well as include at least one light-source that is disposed on an edge portion of the LGP.

The 3D panel assembly 300 may include an LC lens panel 310, a first retardation film 320, a second retardation film 330, and an active driving part 350.

The LC lens panel 310 may include a third substrate 311, a fourth substrate 312, and a second LC layer 313.

The third substrate 311 may include a lens common electrode CE and a first alignment layer 311a including a first alignment direction AA1. The lens common electrode CE may be formed without an opening pattern, such that the lens common electrode is configured to cover the entire (or substantially the entire) surface of the third substrate 311. To this end, it is noted that the first alignment layer 311a may be disposed on the third substrate 311 and, thereby, configured to cover at least some of the lens common electrode CE. Further, it is also contemplated that the lens common electrode CE may be patterned.

The fourth substrate 312 may be disposed opposite to the third substrate 311, and may be configured to include a plurality of lens electrodes LE and a second alignment layer 312a including a second alignment direction AA2. The second alignment direction AA2 may be perpendicular (or substantially perpendicular) to the first alignment direction AA1. The plurality of lens electrodes LE may be grouped into a plurality of electrode groups corresponding to a plurality of LC lens units LU. Each of the plurality of electrode groups may include one or more lens electrodes LE of a predetermined number of lens electrodes LE. The plurality of lens electrodes LE may extend in a third direction D3 sloped from the second direction D2. To this end, it is noted that the first direction D1, second direction D2, and the third direction D3 may be considered as different directions of a same plane. A lens axis of ones of the plurality of lens electrodes LE may have a slope angle θ.

A second slope angle of the second alignment direction AA2 may be the same as (or substantially the same as) the slope angle θ of the lens axis, such that a first slope angle of the first alignment direction AA1 has a difference angle of (or about) 90 degrees from the slope angle θ of the lens axis. In other words, the second alignment direction AA2 may be parallel (or substantially parallel) with the lens axis, and the first alignment direction AA1 may be perpendicular (or substantially perpendicular) to the lens axis.

The second LC layer 313 may be disposed between the third and fourth substrates 311 and 312 and, thereby, between the first and second alignment layers 311a and 312a. Liquid crystal molecules of the second LC layer 313 may be aligned exhibiting a twist angle of (or about) 90 degrees from the first alignment direction AA1 associated with the first alignment layer 311a of the third substrate 311 and the second alignment direction AA2 of the second alignment layer 312a of the fourth substrate 312. In other words, the twist angle of the liquid crystal molecules of the second LC layer 313 may extend in an imaginary plane perpendicular (or substantially perpendicular) to an imaginary plane(s) including the first and second alignment directions AA1 and AA2.

The first retardation film 320 may be disposed adjacent to the LCD panel 110. Illumination emitted from the LCD panel 110 may pass through the first retardation film 320, such that a phase of the illumination is delayed by (or about) half a wavelength (e.g., λ/2). The first retardation film 320 has a λ/2 slow axis RA1. A slope angle of the λ/2 slow axis RA1 is utilized so that a polarized axis of the illumination propagating therethrough will exhibit a phase delayed by about λ/2 and, thereby, will be perpendicular (or substantially perpendicular) to the above-noted lens axis. Accordingly, an optical loss of propagating illumination may be decreased.

The second retardation film 330 may be disposed adjacent to the LC lens panel 310. Illumination emitted from the LC lens panel 310 may pass through the second retardation film 330, such that a phase of the illumination is delayed by (or about) a quarter of a wavelength (e.g., λ/4). The second retardation film 330 has a λ/4 slow axis RA2. In this manner, illumination propagating through the second retardation film 330 may be polarized into left-circularly polarized illumination or right-circularly polarized illumination.

According to exemplary embodiments, the LC lens panel 310, the first retardation film 320, and the second retardation film 330 may be exhibit the following properties as set forth in Table 1.

TABLE 1

| ANGLE | SET VALUE | UNIT |
|---|---|---|
| Polarized Light Incident to LCD Panel 110 | 0 | degrees |
| λ/2 Slow Axis | (θ-90)/2 | degrees |
| 1st Alignment Direction | θ-90 | degrees |
| 2nd Alignment Direction | θ | degrees |
| λ/2 Slow Axis | θ-45 | degrees |

The active driving part 350 may be configured to apply (or otherwise provide) a voltage to the LC lens panel 310. In exemplary embodiments, the active driving part may be or include one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

In the glasses type display mode, the active driving part 350 may be configured to sequentially provide the plurality of lens electrodes LE with a first voltage and a second voltage. For example, the active driving part 350 may provide the plurality of lens electrodes LE with a first voltage, which may be the same (or substantially the same) as a voltage applied to the lens common electrode CE, during odd-numbered frames. To this end, the active driving part 350 may be further configured to provide the plurality of lens electrodes LE with a second voltage, which is different from the voltage applied to the lens common electrode CE, during even-numbered frames. In the no-glasses type display mode, the active driving part 350 may be configured to provide the plurality of lens electrodes LE with a plurality of voltages of various levels to form an LC lens.

The glasses part 400 includes a left-eye part 410 and a right-eye part 420. The left-eye part 410 and the right-eye part 420 are configured to enable a left-eye image and a right-eye image, which include polarized illumination different from each other, respectively, to be correspondingly perceived by a left-eye and a right-eye of an observer. The left-eye part 410 and the right-eye part 420 include a retardation film (not shown) including a (or about) quarter wavelength (e.g., λ/4) slow axis, respectively. These retardation films are described in more detail in association with FIGS. 5A and 5B.

According to exemplary embodiments, the glasses part 400 is used when the display apparatus operates according to the glasses type display mode and, thereby, are not used when the display apparatus operates according to the no-glasses type display mode. When the display apparatus operates according to the glasses type display mode, the LC lens panel 310 operates as a polarizing switching panel configured to polarize incident illumination propagating therethrough. In this manner, the polarizing switching panel is configured to change the polarization of incident illumination to predetermined polarized illumination exhibiting a first polarizing direction or a second polarizing direction.

For example, during odd-numbered frames, the lens common electrode CE of the third substrate 311 and the plurality of lens electrodes LE of the fourth substrate 312 may receive the same voltage. As such, the LC lens panel 310 may be configured in a left-eye ON-state LEFT_ON. In addition, the LCD panel 110 is configured to display left-eye images during odd-numbered frames.

Accordingly, first polarized illumination emitted from the LCD panel 110 and having a first polarizing axis PA1 may propagate through the first retardation film 320 having the λ/2 slow axis RA1. A phase of the first polarized illumination is delayed by (or about) λ/2, such that the first polarized illumination is changed to a second polarized illumination having the second polarizing axis PA2. The second polarized illumination is incident on the LC lens panel 310, such that the second polarized illumination having the second polarizing axis PA2 is changed to a third polarized illumination having a third polarizing axis PA3 and, thereby, propagates through the LC lens panel 310, which is configured in the left-eye ON-state LEFT_ON. The third polarizing axis PA3 is (or about is) 90 degrees offset from the second polarizing axis PA2. The third polarized illumination of the left-eye image is changed to a first circularly polarized illumination CPA1 via the second retardation film 330. In this manner, the first circularly polarized illumination is incident on the left-eye part 410 of the glasses part 400, such that an observer may view a left-eye image during an odd-numbered frame.

During even-numbered frames, the lens common electrode CE of the third substrate 311 and the plurality of lens electrodes LE of the fourth substrate 312 may receive a plurality of voltages, including voltages of maximum potential difference. As such, the LC lens panel 310 may be configured in a right-eye ON-state RIGHT_ON. In addition, the LCD panel 110 is configured to display right-eye images during even-numbered frames.

Accordingly, first polarized illumination emitted from the LCD panel 110 and having a first polarizing axis PA1 may propagate through the first retardation film 320 having the λ/2 slow axis RA1. A phase of the first polarized illumination is delayed by (or about) λ/2, such that the first polarized illumination is changed to a second polarized illumination having the second polarizing axis PA2. The second polarized illumination is incident on the LC lens panel 310, such that the second polarized illumination having the second polarizing axis PA2 is not changed and, thereby, propagates through the LC lens panel 310 which is configured in the right-eye ON-state RIGHT_ON. In this manner, the second polarized illumination is emitted from the LC lens panel 310. The second polarized illumination of the right-eye image is changed to a second circularly polarized illumination CPA2 via the second retardation film 330. In this manner, the second circularly polarized illumination is incident on the right-eye part 420 of the glasses part 400, such that the observer may view a right-eye image during an even-numbered frame.

According to exemplary embodiments, when the display apparatus operates according to the no-glasses type display mode, the LC lens panel 310 operates as the LC lens.

For example, in the no-glasses type display mode, a common voltage may be applied to the lens common electrode CE of the third substrate 311 and various voltages may be applied to the plurality of lens electrodes LE of the fourth substrate 312, such that the LC lens panel 310 exhibits a refractive index distribution associated with a 3D lens, such as a Fresnel lens. The LCD panel 110 is configured to display a frame picture including "n" number of viewing images.

Accordingly, the first polarized illumination of the frame picture emitted from the LCD panel 110 is changed to the second polarized illumination having the second polarizing axis PA2 through the first retardation film 320. The second polarized illumination is incident on the LC lens panel 310. The LC lens panel 310 operating as the LC lens is defined as a multi ON-state MULTI_ON. The second polarized illumination having the second polarizing axis PA2 is changed to a plurality of polarized illuminations, and the "n" viewing images including the polarized illuminations are diffracted toward "n" viewing areas by the LC lens. The "n" viewing images are changed to a plurality of circularly polarized illuminations via propagation through the LC lens panel 310. In this manner, a plurality of observers may view a 3D image in the no-glasses type display mode.

Figure 3:
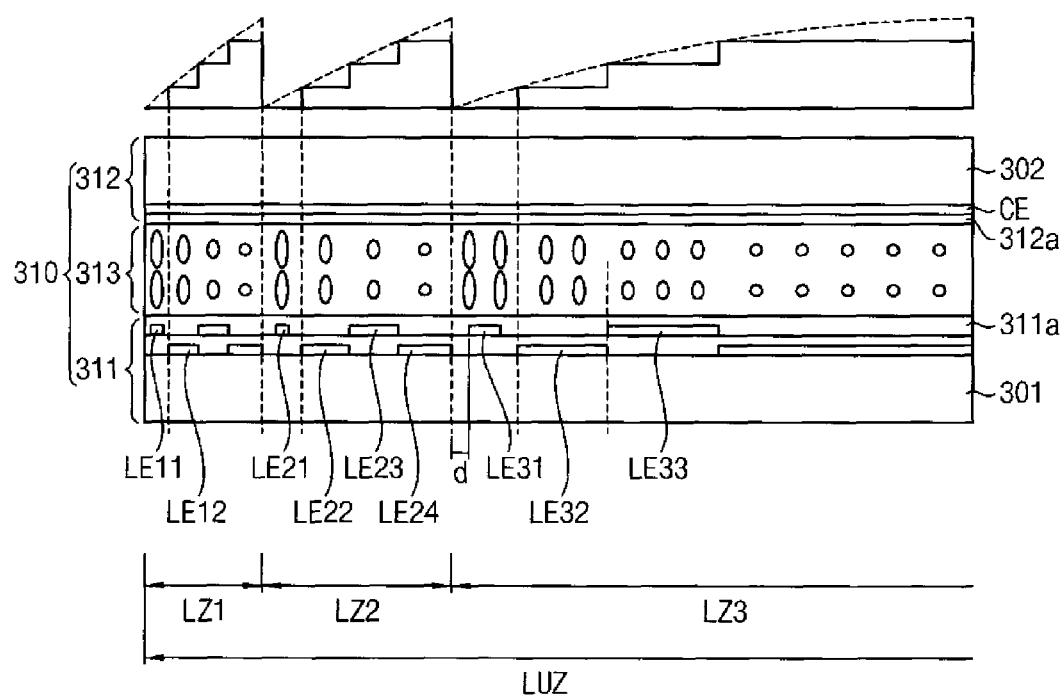
FIG. 3 is a cross-sectional view of the display apparatus of FIG. 1 taken along sectional line I-I', according to exemplary embodiments.

FIG. 3 is a cross-sectional view of the display apparatus of FIG. 1 taken along sectional line I-I', according to exemplary embodiments.

Referring to FIGS. 1 and 3, the LC lens panel 310 may include a third substrate 311, a fourth substrate 312, and a second LC layer 313.

The third substrate 311 includes a first base substrate 301 and a plurality of lens electrodes LE11, LE12, . . . , LE21, LE22, LE23, LE24, . . . , LE31, LE32, LE33, . . . , etc., which is disposed on the first base substrate 301. Accordingly, while only a particular number of lens electrodes LE are illustrated, it is contemplated that any suitable number may be utilized. To this end, it is further contemplated that any number of lens electrodes LE may be associated with specific lens areas, as will become more apparent below. The third substrate further includes a first alignment layer 311a.

The third substrate 311 also includes a unit area LUZ in which the LC lens unit is formed. The unit area LUZ may include a plurality of lens areas. As shown in FIG. 3, the unit area LUZ includes a first lens area LZ1, a second lens area LZ2, and a third lens area LZ3. A plurality of first lens electrodes LE11, LE12, . . . , etc., is disposed in the first lens area LZ1, a plurality of second lens electrodes LE21, LE22, . . . , etc., is disposed in the second lens area LZ2, and a plurality of third lens electrodes LE31, LE32, LE33, . . . , etc., is disposed in the third lens area LZ3. As previously mentioned, it is contemplated that the plurality of lens areas may be associated with any suitable number of corresponding lens electrodes LE even though only particular numbers of lens electrodes LE are illustrated. The lens electrodes LE11, LE12, . . . , LE21, LE22, LE23, LE24, . . . , LLE31, LE32, LE33, . . . , etc., are extended in the lens axis exhibiting the slope angle θ and are arranged in parallel (or substantially in parallel) with each other. In this manner, it is noted that the lens electrodes LE11, LE12, . . . , LE21, LE22, LE23, LE24, . . . , LLE31, LE32, LE33, . . . , etc., may exhibit any suitable shape, such as a bar shape; however, it is also contemplated that the lens electrodes LE11, LE12, . . . , LE21, LE22, LE23, LE24, . . . , LLE31, LE32, LE33, . . . , etc., may be suitably patterned to exhibit any shape and/or apertures therein.

According to exemplary embodiments, the lens electrodes LE*1, LE*2, LE*3, . . . , etc., (where the "*" corresponds to the associated lens area LZ1, LZ2, LZ3, etc.) formed in each of the lens areas LZ1, LZ2, LZ3, etc., are arranged in two different layers and end portions of adjacent lens electrodes LE*2 and LE*3 extend to a common vertical line with respect to the third substrate 311. In other words, lens electrodes LE*2 and LE*3 are disposed in different planes, but commonly extend in opposite horizontal directions from a same horizontal location. In each of the lens areas LZ1, LZ2, LZ3, etc., a lens electrode LE*1 on which a slope of a phase distribution begins correspondingly, or in other words, to which a maximum voltage is applied, includes a relatively minor width as compared to lens electrodes LE*2 and LE*3. In addition, the lens electrode LE*1 is respectively spaced apart from end portions of the adjacent lens electrodes LE*4 and LE*2 by a spacing distance "d" in a horizontal direction. It is noted that lens electrode LE*4 may be disposed in association with a different lens area than lens electrode LE*1 and LE*2. For instance, lens electrode LE24 is disposed in association with second lens area LZ2, whereas lens electrodes LE31 and LE32 are disposed in association with the third lens area LZ3. As such, each of the adjacent lens electrodes LE*4 and LE*2 is arranged in a different layer and is spaced apart from the lens electrode LE*1.

In exemplary embodiments, a LC director may be determined by a nearest electric field, which is generated between both left and right sides of the lens electrode (LE11, LE21, LE31, etc.) to which the maximum voltage is applied, so that a reversed-slope region (e.g., a Fly Back Region FBR) or a discontinuity region is generated according to the phase distribution. It is noted that exemplary FBRs are described in more detail in association with FIGS. 4A and 4B. As such, as the width of the lens electrode (LE11, LE21, LE31, etc.) receiving the maximum voltage is decreased, the reversed-slope region or the discontinuity region may be decreased. For instance, the portion of the phase distribution associated with the first lens area LZ1 is less wide than the portion of the phase distribution associated with the second lens area LZ2. In accordance therewith, the width of lens electrode LE11 is less than the width of the lens electrode LE21. Accordingly, a diffraction efficiency of the illumination may be improved. When the width of the lens electrode (LE11, LE21, LE31, etc.) on which a slope of a phase distribution begins in each lens area (LZ1, LZ2, LZ3, etc.) is decreased, the diffraction efficiency of the illumination may be improved.

The first alignment layer 311a has the first alignment direction AA1, and the first alignment direction AA1 is perpendicular (or substantially perpendicular) to the above-noted lens axis of lens electrodes LE11, LE12, ..., LE21, LE22, LE23, LE24, ..., LLE31, LE32, LE33, ..., etc. In other words, the slope angle of the first alignment direction AA1 includes a difference angle of (or about) 90 degrees from the slope angle θ of the lens axis.

The fourth substrate 312 includes a second base substrate 302, a lens common electrode CE disposed on the second base substrate 302, and a second alignment layer 312a disposed on the lens common electrode CE. The lens common electrode CE may not include an opening pattern; however, it is also contemplated that the lens common electrode CE may be suitably patterned.

The second alignment layer 312a has the second alignment direction AA2, and the second alignment direction AA2 may be parallel (or substantially parallel) to the above-noted lens axis. In other words, the slope angle of the second alignment direction AA2 is the same as (or substantially the same as) the slope angle θ of the lens axis.

In the glasses type display mode, during odd-numbered frames, the common voltage is applied to the lens common electrode CE of the LC lens panel 310 and the common voltage is applied to the lens electrodes LE11, LE12, ..., LE21, LE22, LE23, LE24, ..., LLE31, LE32, LE33, ..., etc., of the LC lens panel 310. During even-numbered frames, the common voltage is applied to the lens common electrode CE of the LC lens panel 310 and a maximum voltage is applied to the lens electrodes LE11, LE12, ..., LE21, LE22, LE23, LE24, ..., LLE31, LE32, LE33, ..., etc., of the LC lens panel 310.

In the no-glasses type display mode, the common voltage is applied to the lens common electrode CE of the LC lens panel 310. Various voltages are applied to the lens electrodes LE11, LE12, ..., LE21, LE22, LE23, LE24, ..., LLE31, LE32, LE33, ..., etc., of the LC lens panel 310 to form the LC lens exhibiting a refractive index distribution. For example, a maximum voltage may be applied to a first lens electrode LE21 in the second lens area LZ2, a minimum voltage may be applied to a fourth lens electrode LE24, and gradually decreasing voltages may be applied to the remainder electrodes (e.g., the second and third lens electrodes LE22 and LE23) disposed therebetween. The same may be true for the other lens areas, such as the first lens area LZ1 and the second lens area LZ2. As such, and as shown in FIG. 3, the LC lens panel 310 may be configured to operate as the LC lens including a refractive index distribution, which may be similar to a Fresnel lens.

Figure 4A:
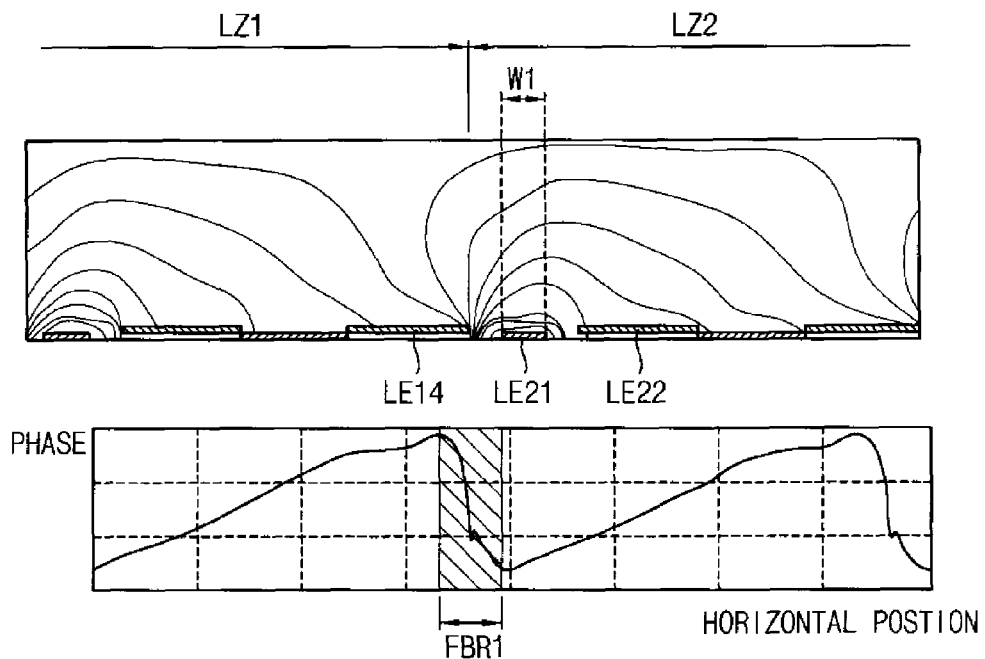
FIGS. 4A and 4B illustrate phase distributions of a LC lens panel, according to exemplary embodiments.
Figure 4B:
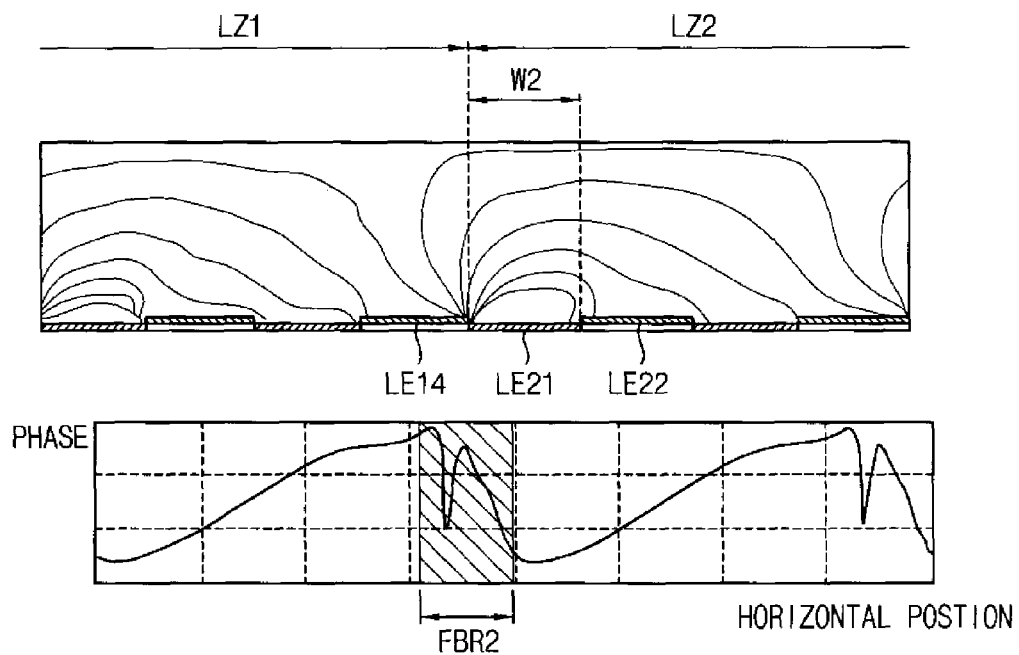

FIGS. 4A and 4B illustrate phase distributions of a LC lens panel, according to exemplary embodiments.

As seen in FIG. 4A and with continued reference to FIG. 3, the LC lens panel 310 includes a lens electrode (e.g., LE21) in association with a slope of a phase distribution begins among other lens electrodes (e.g., LE22, LE23, LE24, etc.) in the lens area (e.g., the second lens area LZ2). For descriptive purposes, the example of the second lens area LZ2 will be continued; however, the description is applicable to the other lens areas, such as the first lens area LZ1 and the third lens area LZ3. The lens electrode LE21 has a relatively minor width W1 as compared with the other lens electrodes LE22, LE23, and LE24, and is spaced apart from an end portion of adjacent lens electrodes LE14 and LE22 in a horizontal direction.

With continued reference to FIG. 4A, a first lens electrode LE21 on which a slope of a phase distribution begins among the other lens electrodes LE22, LE23, LE24, etc. in the second lens area LZ2 includes a relatively minor width W1, and is spaced apart from the end portion of adjacent lens electrodes LE14 and LE24 in a horizontal direction. A maximum voltage is applied to the first lens electrode LE21 to form the LC lens. At or near a transition region between electric fields associated with corresponding lens areas, which is generated between both left and right sides of the first lens electrode LE21, a reversed-slope (or fly back) region FBR1 (or a discontinuity region) is formed. In this manner, the width of the first lens electrode LE21 is decreased so that the reversed-slope region FBR1 is decreased.

Adverting to FIG. 4B, a comparative exemplary embodiment is illustrated, wherein the width W2 of the first lens electrode LE21 is the same as or similar to the widths of the other lens electrodes (e.g., lens electrodes LE22, LE23, LE24, etc.). The lens electrode LE21 on which a slope of a phase distribution begins among the other lens electrodes LE22, LE23, LE24, etc. in each of the lens areas (e.g., lens area LZ2) includes end portions that terminates at (or near) the same vertical line as corresponding end portions of adjacent lens electrodes (e.g., lens electrodes LE14 and LE22) in the horizontal direction. It is noted; however, that adjacent lens electrodes are disposed on different layers, such that every other lens electrode may be disposed on a same layer.

Referring to FIG. 4B, an end portion of a first lens electrode LE21 on which a slope of a phase distribution begins among the other lens electrodes LE22, LE23, LE24, etc. in the second lens area LZ2 is not spaced apart from an end portion of adjacent lens electrodes (e.g., LE14 and LE22) in the horizontal direction and is located in the same vertical line as the end portion of adjacent lens electrodes (LE14 and LE22) in the horizontal direction. A width W2 of the first lens electrode LE21 is larger than the width W1 shown in FIG. 4A. To form the LC lens, a maximum voltage may be applied to the first lens electrode LE21. At or near a transition region between electric fields associated with corresponding lens areas (e.g., between lens areas LZ1 and LZ2), which is generated between both left and right sides of the first lens electrode LE21, a reversed-slope (or fly back) region FBR2 is generated.

Referring to FIGS. 4A and 4B, the width W2 of the first lens electrode LE21 is larger than the width W2, such that the width of the reversed-slope region FBR2 is larger than the width of the reversed-slope region FBR1. As a result, the diffraction efficiency of the illumination based on the reversed-slope region FBR2 is about 56.2%, and is about 77.1% in the reversed-slope region FBR1. When the width of the lens electrode (LE*1) on which a slope of a phase distribution begins among the other lens electrodes (LE*2, LE*3, LE*4, etc.) in the lens area (LZ*) is decreased, the corresponding reversed-slope region (FBR*) associated therewith may be decreased, such that the diffraction efficiency may be improved.

Figure 5A:
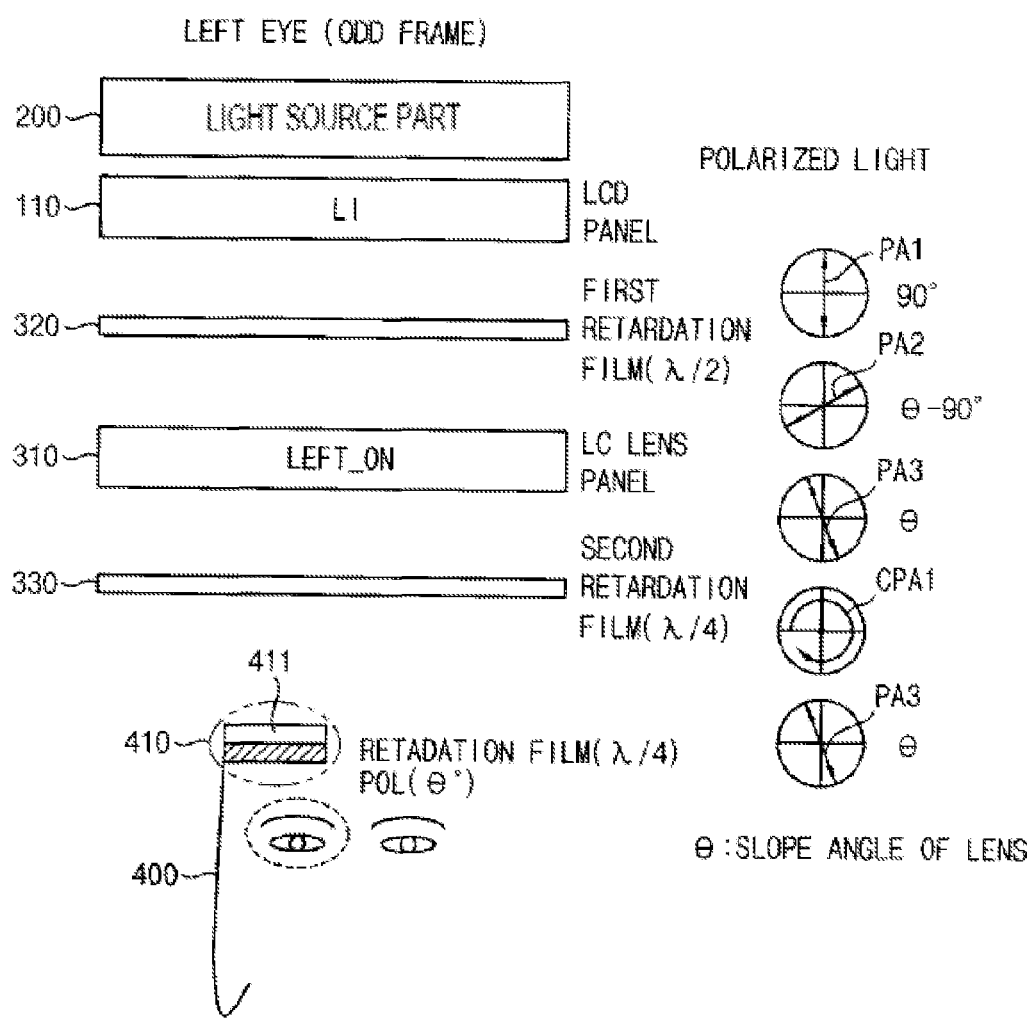
FIGS. 5A and 5B conceptually illustrate a method to display a 3D image in a glasses mode, according to exemplary embodiments.
Figure 5B:
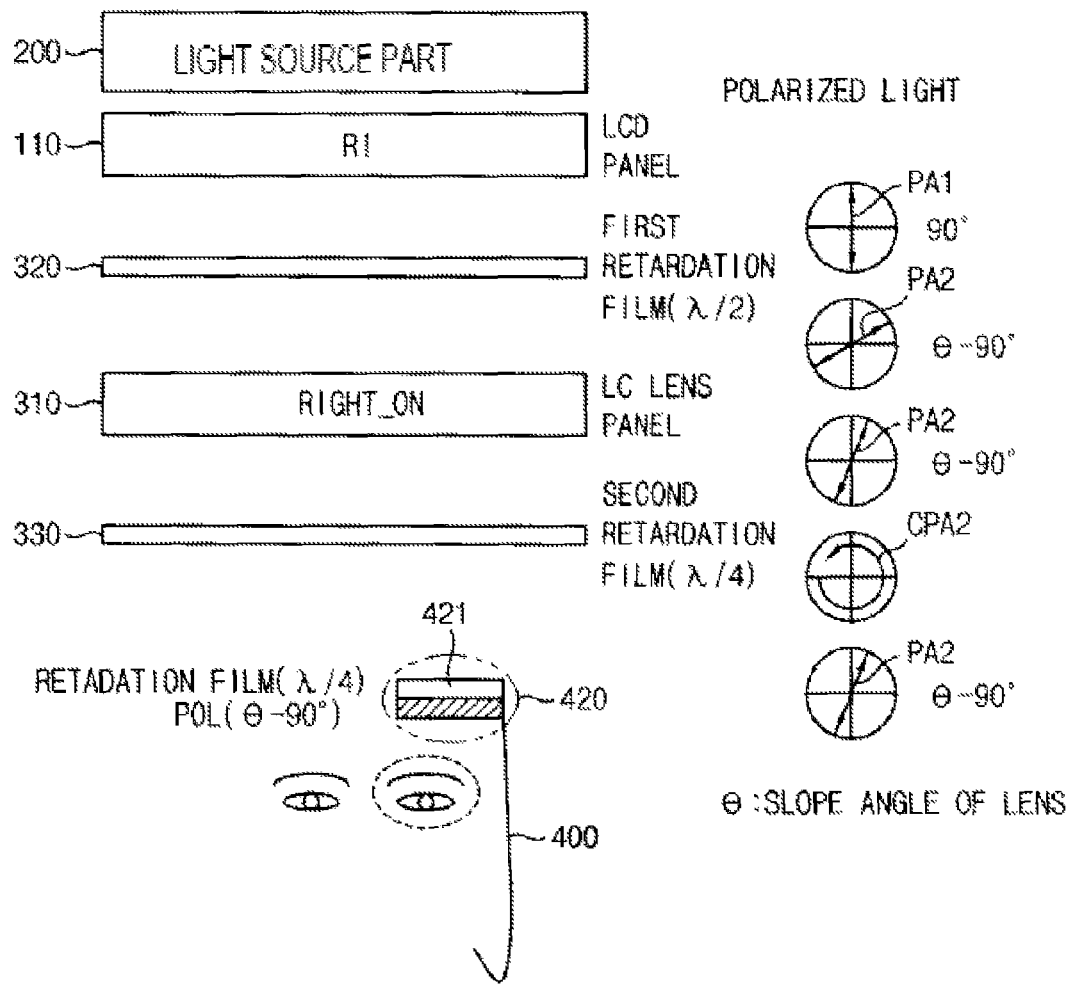

FIGS. 5A and 5B conceptually illustrate a method to display a 3D image in a glasses mode, according to exemplary embodiments.

Referring to FIGS. 1 and 5A, during odd-numbered frames, the LCD panel 110 is configured to display left-eye images LI. The same voltage is applied to the lens common electrode CE of the third substrate 311 and the plurality of lens electrodes LE of the fourth substrate 312 of the LC lens panel 310, such that the LC lens panel 310 is configured to operate in a left-eye ON-state LEFT_ON.

The left-eye image LI is emitted from the LCD panel 110. The left-eye image LI is a first polarized illumination having a first polarizing axis PA1. A phase of the first polarized illumination of the left-eye image LI is delayed by about λ/2 via propagation through the first retardation film 320 having a λ/2 slow axis RA1. Namely, the first retardation film 320 causes the first polarized illumination to be changed to a second polarized illumination having a second polarizing axis PA2. The second polarized illumination is incident on the LC lens panel 310. Propagation through LC lens panel 310 causes the second polarized illumination of the left-eye image LI to be changed to a third polarized illumination having a third polarizing axis PA3. In this manner, the LC lens panel 310 is configured according to the left-eye ON-state LEFT_ON. The third polarizing axis PA3 has a difference angle of (or about) 90 degrees from the second polarizing axis PA2. The third polarized illumination of the left-eye image LI is changed to a right-circularly polarized illumination CPA1 via propagation through the second retardation film 330.

The left-eye part 410 of the glasses part 400 includes a retardation film 411 having a λ/4 slow axis. The right-circularly polarized illumination CPA1 is changed to the third polarized illumination of the third polarizing axis PA3 via propagation through the retardation film 411, such that the third polarized illumination of the left-eye image LI can be perceived by the left-eye of an observer. As such, the observer may view a left-eye image during odd-numbered frames.

Referring to FIGS. 2 and 5B, during even-numbered frames, the LCD panel 110 is configured to display a right-eye image RI. A plurality of voltages, including voltages of maximum potential difference, are applied to the lens common electrode CE of the third substrate 312 and the plurality of lens electrodes LE of the fourth substrate 312 of the LC lens panel 310, such that the LC lens panel 310 is configured to operate in a right-eye ON-state RIGHT_ON.

The right-eye image RI is emitted from the LCD panel 110. The right-eye image RI is a first polarized illumination having a first polarizing axis PA1. A phase of the first polarized illumination of the right-eye image RI is delayed by about λ/2 via propagation through the first retardation film 320 having a λ/2 slow axis RA1. Namely, the first retardation film 320 causes the first polarized illumination to be changed to a second polarized illumination having a second polarizing axis PA2. The second polarized illumination is incident on the LC lens panel 310. The second polarized illumination of the right-eye image RI is not changed when propagating through the LC lens panel 310, which is configured to operate in the right-eye ON-state RIGHT_ON, such that the second polarized illumination of the right-eye image RI is emitted from the LC lens panel 310. The second polarized illumination of the right-eye image RI is changed to a left-circularly polarized illumination CPA2 via propagation through the second retardation film 330.

The right-eye part 420 of the glasses part 400 includes a retardation film 421 having a λ/4 slow axis. The left-circularly polarized illumination CPA2 is changed to the second polarized illumination of the second polarizing axis PA2 via propagation through the retardation film 421, such that the second polarized illumination of the right-eye image RI can be perceived by the right-eye of an observer. As such, the observer may view a right-eye image during even-numbered frames.

Accordingly, the observer may view a 3D image in the glasses type display mode when at least one left-eye image and at least one right-eye image are presented and, thereby, autonomically combined by the observer.

Figure 6:
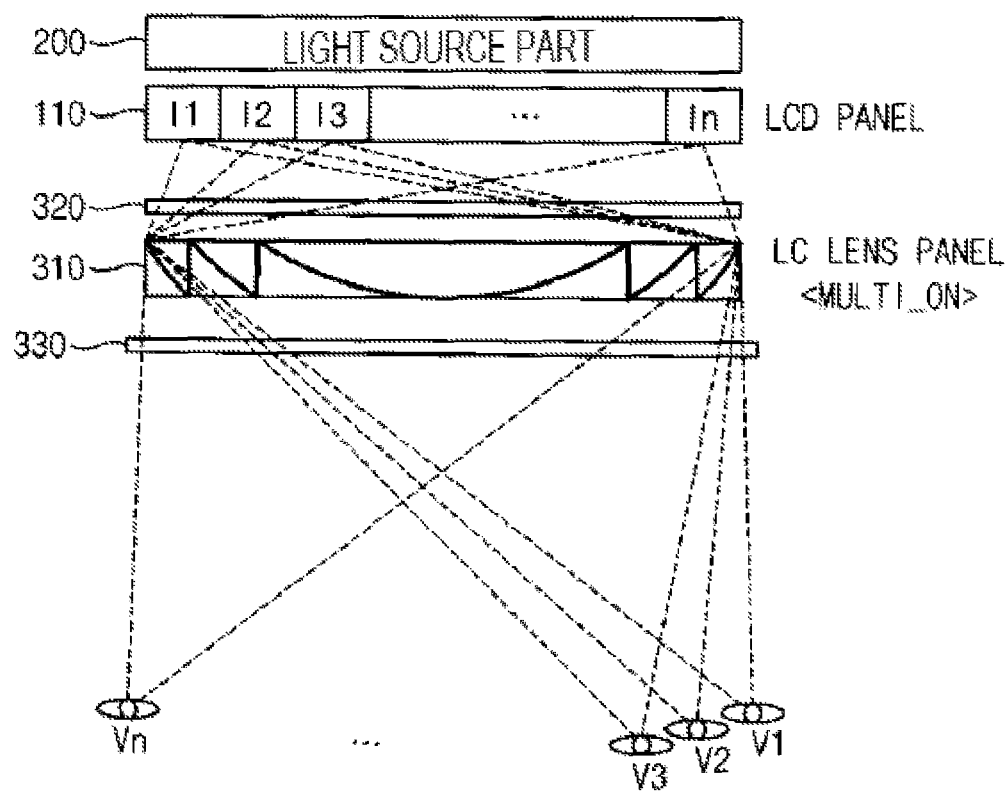
FIG. 6 conceptually illustrates a method to display a 3D image in a no-glasses mode, according to exemplary embodiments.

FIG. 6 conceptually illustrates a method to display a 3D image in a no-glasses mode, according to exemplary embodiments.

Referring to FIGS. 2 and 6, a plurality of sub pixels in the LCD panel 110 respectively display "n" viewing images (where "n" is a natural number). As such, the LCD panel 110 displays a frame picture including the "n" viewing images I1, I2, . . . , In.

A common voltage is applied to the lens common electrode CE of the third substrate 311 and various voltages are applied to the plurality of lens electrodes LE of the fourth substrate 312 to form the LC lens exhibiting a refractive index distribution corresponding to a 3D lens, such as a Fresnel lens.

The "n" viewing images I1, I2, . . . , In of the first polarized illumination emitted from the LCD panel 110 are changed to the second polarized illumination having the second polarizing axis PA2 via propagation through the first retardation film 320. The second polarized illumination is incident on the LC lens panel 310.

The LC lens panel 310 is configured to operate as the LC lens and, thereby, is defined as a multi ON-state MULTI_ON. The second polarized illumination having the second polarizing axis PA2 is changed to a plurality of polarized illuminations, and the "n" viewing images I1, I2, . . . , In of the polarized illuminations are diffracted toward "n" view areas by the LC lens panel 310. The "n" viewing images I1, I2, . . . , In are changed to a plurality of circularly polarized illuminations via propagation through the LC lens panel 310. In this manner, a plurality of observers may view a 3D image in the no-glasses type display mode.

According to exemplary embodiments, the LC lens panel 310 includes the second LC layer 313 having a twist angle of (or about) 90 degrees, so that the observer may view the 3D image in both the glasses and no-glasses modes. In addition, the first retardation film 320 having the slow axis RA1 of λ/2 phase delay corresponding to the slope angle of the plurality of lens electrodes LE is disposed between the LCD panel 110 and the LC lens panel 330 so that illumination loss may be decreased. Further, the LC lens panel 310 includes the plurality of lens electrodes LE*1 on which a slope of a phase distribution begins among the other lens electrodes (LE*2, LE*3, LE*4, etc.) in the lens areas (LZ*), such that the lens electrode LE*1 includes a relatively minor width as compared to the other lens electrodes (LE*2, LE*3, LE*4, etc.), and is spaced apart from an end portion of adjacent lens electrodes (LE*4 and LE*2), so that the reversed-slope region FBR* may be decreased and the diffraction efficiency of the illumination may be improved. Moreover, polarizing plates respectively disposed on upper and lower surfaces of the LC lens panel 310 may be omitted so that illumination loss by the polarizing plates may be decreased and illumination efficiency may be improved.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal ("LC") lens panel, comprising:
a first substrate comprising:
a first base substrate,
a lens common electrode disposed on the first base substrate, and
a first alignment layer disposed on and directly contacting the lens common electrode, the first alignment layer comprising a first alignment direction;
a second substrate comprising:
a second base substrate opposite to the first base substrate,
a plurality of lens electrodes that extend in a lens axis forming an acute angle with an edge of the second base substrate, the plurality of lens electrodes being parallel with each other, and
a second alignment layer disposed on the plurality of lens electrodes, the second alignment layer comprising a second alignment direction substantially perpendicular to the first alignment direction, the plurality of lens electrodes extending parallel with the second alignment direction; and
a LC layer disposed between the first and second alignment layers.

2. The LC lens panel of claim 1, wherein the first alignment direction is substantially perpendicular to the lens axis.

3. The LC lens panel of claim 1, wherein application of a plurality of voltages to the plurality of lens electrodes causes, at least in part:
the LC lens panel to be divided into a plurality of lens areas exhibiting a plurality of refractive index distributions respectively beginning at a plurality of first ones of the plurality of lens electrodes; and
the first ones of the plurality of lens electrodes at which corresponding slopes of the plurality of refractive index distributions begin are spaced apart from respective end portions of directly adjacent lens electrodes.

4. A lens panel assembly, comprising:
a liquid crystal ("LC") lens panel, comprising:
a first substrate,
a lens common electrode disposed on the first substrate,
a first alignment layer disposed on the lens common electrode, the first alignment layer comprising a first alignment direction,
a second substrate,
a plurality of lens electrodes that extend in a lens axis, the plurality of lens electrodes being disposed on the second substrate and being parallel with each other, and
a second alignment layer disposed on the plurality of lens electrodes, the second alignment layer comprising a second alignment direction substantially perpendicular to the first alignment direction, and
a LC layer disposed between the first and second alignment layers; and
a first retardation film disposed on the second substrate, the first retardation film being configured to change a polarizing direction of incident illumination based on a slope angle θ of the lens axis.

5. The lens panel assembly of claim 4, wherein the first retardation film comprises a λ/2 slow axis, and an angle of the λ/2 slow axis is about (θ−90°)/2.

6. The lens panel assembly of claim 5, further comprising:
a second retardation film disposed on the first substrate, the second retardation film being configured to change polarized illumination propagating therethrough to circularly polarized illumination.

7. The lens panel assembly of claim 6, wherein the second retardation film comprises a λ/4 slow axis, and the angle of the λ/4 slow axis is about θ−45°.

8. The lens panel assembly of claim 4, wherein the first alignment direction is substantially perpendicular to the lens axis.

9. The lens panel assembly of claim 4, wherein application of a plurality of voltages to the plurality of lens electrodes causes, at least in part:
the LC lens panel to be divided into a plurality of lens areas exhibiting a plurality of refractive index distributions respectively beginning at a plurality of first ones of the plurality of lens electrodes; and
the first ones of the plurality of lens electrodes at which corresponding slopes of the plurality of refractive index distributions begin are spaced apart from respective end portions of directly adjacent lens electrodes.

10. The lens panel assembly of claim 4, further comprising:
an active driving part configured to drive the LC lens panel,
wherein the active driving part is configured to, in association with a stereoscopic display mode, provide the plurality of lens electrodes with a voltage that is the same as a voltage applied to the lens common electrode in association with an odd-numbered frame and a voltage that is different from the voltage applied to the lens common electrode in association with an even-numbered frame, and
wherein the active driving part is configured to, in association with an autostereoscopic display mode, provide the plurality of lens electrodes with a plurality of voltages to form an LC lens.

11. A display apparatus, comprising:
a display panel configured to display an image; and
a liquid crystal ("LC") lens panel disposed on the display panel, the LC lens panel comprising:
a first substrate,
a lens common electrode disposed on the first substrate,
a first alignment layer disposed on and directly contacting the lens common electrode, the first alignment layer comprising a first alignment direction,
a second substrate,
a plurality of lens electrodes that extend in a lens axis forming an acute angle with an edge of the second substrate, the plurality of lens electrodes being disposed on the second substrate and being parallel with each other, and a second alignment layer disposed on the plurality of lens electrodes, the second alignment layer comprising a second alignment direction substantially perpendicular to the first alignment direction, the plurality of lens electrodes extending parallel with the second alignment direction, and a LC layer disposed between the first and second alignment layers, wherein the display apparatus comprises an autostereoscopic display mode and a stereoscopic display mode.

12. The display apparatus of claim 11, further comprising:
an image driving part configured to:
  display, in association with the stereoscopic display mode, a left-eye image via the display panel in association with an odd-numbered frame,
  display, in association with the stereoscopic display mode, a right-eye image via the display panel in association with an even-numbered frame, and
  display, in association with the autostereoscopic display mode, a frame picture comprising a plurality of viewing images via the display panel.

13. The display apparatus of claim 12, further comprising:
an active driving part configured to drive the LC lens panel,
wherein the active driving part is configured to, in association with the stereoscopic display mode, provide the plurality of lens electrodes with a voltage that is the same as a voltage applied to the lens common electrode in association with the odd-numbered frame and a voltage that is different from the voltage applied to the lens common electrode in association with the even-numbered frame, and
wherein the active driving part is configured to, in association with the autostereoscopic display mode, provide the plurality of lens electrodes with a plurality of voltages to form a LC lens.

14. The display apparatus of claim 12, wherein the first alignment direction is substantially perpendicular to the lens axis.

15. The display apparatus of claim 11, further comprising:
a first retardation film disposed on the display panel, wherein:
  the first retardation film comprises a $\lambda/2$ slow axis,
  a slope angle of the lens axis is $\theta$, and
  an angle of the $\lambda/2$ slow axis is about $(\theta-90°)/2$.

16. The display apparatus of claim 15, further comprising:
a second retardation film disposed on the LC lens panel,
wherein the second retardation film is configured to change incident polarized illumination propagating therethrough to circularly polarized illumination.

17. The display apparatus of claim 16, wherein the second retardation film comprises a $\lambda/4$ slow axis, and the angle of the $\lambda/4$ slow axis is about $\theta-45°$.

18. The display apparatus of claim 16, wherein, in association with the stereoscopic display mode, polarization glasses are utilized to perceive three-dimensional images, and wherein the polarization glasses comprise:
  a left-eye part comprising a retardation film comprising a $\lambda/4$ slow axis; and
  a right-eye part comprising a retardation film comprising a $\lambda/4$ slow axis.

* * * * *